MOSES L. ANDREW, OF CINCINNATI, OHIO, ASSIGNOR TO HIMSELF AND GEORGE BURROWS, OF SAME PLACE.

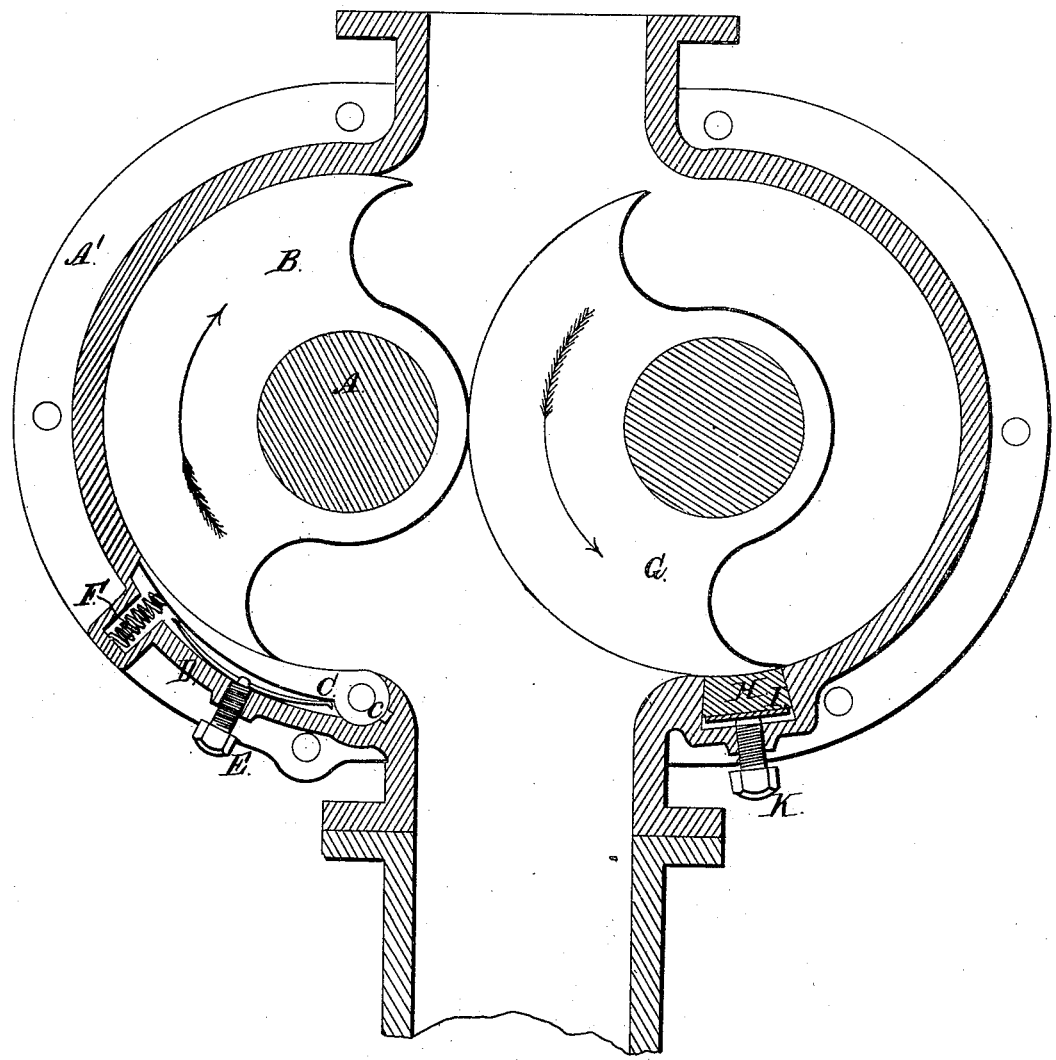

Letters Patent No. 89,268, dated April 27, 1869.

IMPROVEMENT IN ROTARY PUMPS.

The Schedule referred to in these Letters Patent and making part of the same.

*To all whom it may concern:*

Be it known that I, MOSES L. ANDREW, of Cincinnati, Hamilton county, State of Ohio, have invented a certain new and useful Improvement in Rotary Pumps; and I do hereby declare the following to be a sufficiently full, clear, and exact description thereof to enable one skilled in the art to which my invention appertains to make and use it, reference being had to the accompanying drawings, which form a part of this specification.

My invention relates to that class of rotary pumps, known as "double-cylinder," in which solid pistons, not capable of expansion, are fitted, geared together, and rotate in opposite directions; and consists in peculiar devices for expansion-packing, fitted into the cylinder casing.

In the accompanying drawing, a cross-section of a rotary pump is represented, which embodies my invention.

The shaft A is the one to which the driving-pulley of the pump is secured.

As this shaft, with its accompanying piston B, may be submitted to strain from the pull of the belt from any possible direction, I have provided for this side of the cylinder packing of a very elastic character, as follows:

A valve, or curved plate C, is journalled in the heads of the cylinder at c, and is so embedded in the casing A' that its curved surface will be coincident with the circle of the cylinder.

Behind the valve a spring, D, is fitted, which is attached to and adjusted by a set-screw, E.

It will be seen that the spring will give all the elasticity required, and in combination with the set-screw, will allow the valve, or plate C, to be adjusted with the greatest nicety.

A very inferior modification of the spring D and set-screw may consist of a spiral spring, F, acting against the valve.

If this spiral spring, however, were adjusted by means of a set-screw, the same effect would be produced as with the spring D.

In the operation of the pump, the piston G is kept tight against its cylinder by the outward strain of the gears that connect the shafts, there being no belt-strain to counteract it.

Though of course the device C D E can be attached to this side, if preferred, I have provided for this packing of cheaper construction, with no very great elasticity, but capable of adjustment.

It consists of a dovetail-shaped piece of hard rubber, H, fitted into a dovetail cavity in the cylinder A'.

Behind the rubber a plate, I, is fitted, and the whole is adjusted to press hard against the revolving piston G, by the set-screw K.

I claim herein as new, and of my invention—

1. The arrangement of the hinged valve, or plate C c, spring D, and set-screw E, with reference to the piston B, substantially as shown and described.

2. The arrangement of the tapering packing H, plate I, and set-screw K, with reference to the piston G, substantially as shown and described.

In testimony of which invention, I hereunto set my hand.

MOSES L. ANDREW.

Witnesses:
EUGENE TRUMP,
GEORGE BURROWS.